(12) United States Patent
Mantripragada et al.

(10) Patent No.: US 8,161,540 B2
(45) Date of Patent: Apr. 17, 2012

(54) SYSTEM AND METHOD FOR UNIFIED COMMUNICATIONS THREAT MANAGEMENT (UCTM) FOR CONVERGED VOICE, VIDEO AND MULTI-MEDIA OVER IP FLOWS

(75) Inventors: Srinivas Mantripragada, Cupertino, CA (US); Amitava Mukherjee, San Ramon, CA (US); Barry Bomzer, Danville, CA (US)

(73) Assignee: RedShift InterNetworking, Inc., Milpitas, CA (US)

( * ) Notice: Subject to any disclaimer, the term of this patent is extended or adjusted under 35 U.S.C. 154(b) by 834 days.

(21) Appl. No.: 12/181,135

(22) Filed: Jul. 28, 2008

(65) Prior Publication Data

US 2009/0028135 A1 Jan. 29, 2009

Related U.S. Application Data

(60) Provisional application No. 60/952,479, filed on Jul. 27, 2007, provisional application No. 60/980,990, filed on Oct. 18, 2007.

(51) Int. Cl.
G06F 15/16 (2006.01)
(52) U.S. Cl. ........... 726/13; 709/224; 370/389; 370/474
(58) Field of Classification Search ........................ None
See application file for complete search history.

(56) References Cited

U.S. PATENT DOCUMENTS

| | | | | |
|---|---|---|---|---|
| 2002/0196782 A1* | 12/2002 | Furukawa et al. | ............ | 370/352 |
| 2003/0002676 A1* | 1/2003 | Stachura et al. | .............. | 380/260 |
| 2003/0128717 A1* | 7/2003 | Johnson et al. | ............... | 370/458 |
| 2004/0049701 A1* | 3/2004 | Le Pennec et al. | ........... | 713/201 |
| 2004/0148252 A1* | 7/2004 | Fleishman | ....................... | 705/39 |
| 2004/0185931 A1* | 9/2004 | Lowell et al. | ................... | 463/17 |
| 2005/0005150 A1* | 1/2005 | Ballard | ......................... | 713/200 |
| 2005/0288961 A1 | 12/2005 | Tabrizi | | |
| 2006/0182029 A1* | 8/2006 | Kealy et al. | .................... | 370/230 |
| 2006/0288420 A1 | 12/2006 | Mantripragada et al. | | |
| 2007/0110053 A1* | 5/2007 | Soni et al. | ..................... | 370/389 |

FOREIGN PATENT DOCUMENTS

WO 2008/071388 10/2008

OTHER PUBLICATIONS

R. Dantu, and P. Kolan, "Detecting Spam in VoIP Networks," in Proc. of the Steps to Reducing Unwanted Traffic on the Internet Workshop, pp. 31-37, Cambridge MA, Jul. 2005.
U.S. Appl. No. 12/254,730 "System and Method for Detecting Spam Over the Internet Telephony (SPIT) in IP Telecommunication Systems".
U.S. Appl. No. 12/254,735 "System and Method to Precisely Learn and Abstract the Positive Flow Behavior of a Unified Communication (UC) Application and Endpoints".

* cited by examiner

*Primary Examiner* — Jason Mattis
*Assistant Examiner* — James P Duffy
(74) *Attorney, Agent, or Firm* — Orrick, Herrington & Sutcliffe, LLP

(57) ABSTRACT

A method and system for unified communications threat management (UCTM) for converged voice and video over IP is disclosed. A computer-implemented method for threat management receives an incoming packet. The incoming packet is broken into sub-packets and fed to a plurality of packet processing engines. Each packet processing engine inspects the sub-packets and annotate the sub-packets with meta-data. The annotated sub-packets are combined and processed by a plurality of application engine to generate a processed packet. The processed packet is classified and stored in a database.

22 Claims, 7 Drawing Sheets

SYSTEM AND METHOD FOR UNIFIED COMMUNICATIONS THREAT MANAGEMENT (UCTM) FOR CONVERGED VOICE, VIDEO AND MULTI-MEDIA OVER IP FLOWS

The present application claims the benefit of and priority to U.S. Provisional Patent Application No. 60/952,479 filed on Jul. 27, 2007, entitled "Synchronous Flow Security," and Application No. 60/980,990 filed on Oct. 18, 2007, entitled "A Fine-Grained Unified Threat Management (UTM) Architecture and System for Converged Voice and Video Flows." U.S. Provisional Patent Applications 60/952,479 and 60/980,990 are hereby incorporated by reference.

FIELD

The field of the invention relates generally to communication over Internet Protocol (IP). In particular, the present method and system is directed to unified communications threat management (UCTM) for converged voice, video, and multi-media over IP flows.

BACKGROUND

The emergence of Voice-over-IP (VoIP) and Unified Communications (UC) technology has caused a fundamental shift in the telecommunications industry. Due to numerous benefits of VoIP/UC systems ranging from low cost, manageability, pervasiveness of IP communication networks and easy integration with other IP-based software-enabled services, traditional Private Branch eXchange (PBX)/UC systems are increasingly replaced with their IP counterparts. The growing popularity of VoIP/UC networks is largely influenced by two benefits: cost savings achieved by migration from Public Switched Telephone Network (PSTN) to VoIP networks and the flexibility of adding new services and applications to the standard telephony platform. The underlying common IP-based communication platform enables richer application and services than were otherwise possible. The migration from PSTN to VoIP fundamentally has changed the communications landscape and the way various end-nodes of a network communicate with one another or with applications.

However, massive deployment of VoIP/UC faces challenges that need to be effectively addressed to gain widespread adoption. VoIP/UC solution providers need to provide high quality, reliability and security standards that traditional PSTNs offer. Developing a robust architecture that adheres to these constraints is a challenging task.

A number of recent studies showed that nearly half of VoIP/UC service providers planning to deploy VoIP/UC networks affirm that current networks and applications are inherently insecure. The security issue is a major concern for VoIP/UC service providers because security vulnerabilities are not yet well understood, and preventive measures for security have not yet been fully adopted.

VoIP/UC security is vastly different from conventional data security due to the real-time nature of VoIP/UC communications. Real-time characteristics include: zero down time, near close to 100% Quality-of-Service (QoS), reliability, low latency overheads and security. VoIP/UC solutions need to comply with the complex VoIP UC network standards involving a myriad of protocols, applications and devices while maintaining the dependency with existing PSTN systems. A VoIP/UC network is a converged network of PSTN and IP-telephony, thus it is subject to security threats that potentially emanate from either one of the two networks. Due to the number of potential threat vectors arising from the convergence of PSTN and IP-telephony networks, the underlying security protection measures based on either one of the network architectures are not well suited to counterattack most of them. In addition, VoIP/UC networks require close-to-perfect reliability because of the real-time requirement for voice communication. For data-only communication, a typical response to a security attack involves a human intervention, which incurs significant time delays to reduce the scope of the threat and provides appropriate mitigation solutions. Unlike data-only communication, human interventions are inadequate for VoIP/UC communications, which require a real-time response to security threats.

VoIP/UC communication is highly sensitive to QoS parameters. A VoIP/UC security solution causing a noticeable loss in voice quality is unacceptable. Any interruption in the flow of packets, reassembly or jitter impacts the quality of voice conversation. For data communication, the lost data is retransmitted causing additional delay. While this may be acceptable for simple data communication, retransmission in the VoIP/UC realm implies that the caller has to repeat the lost voice message or reinvoke the UC service, which makes any solution that introduces time delay by retransmission an unacceptable solution.

Latency is another factor to consider when deploying VoIP/UC solutions. Modern data security solutions employ encryption and/or deep-packet inspection methods to improve security. Both of these methods introduce additional time delays and jitters to VoIP/UC packet streams, thus impacting the overall QoS of voice steams.

VoIP/UC networks interacting with and depending on existing PSTN networks pose a new set of challenges such as attack entry vectors and application threats. With a myriad of deployment solutions and architectures spanning the VoIP and traditional PSTN networks, the complexity of threat detection and mitigation grows exponentially.

The emergence of Voice-over-IP (VoIP), Unified Communications (UC) and Communications Enabled Business Process (CEBP) solutions has changed the way that enterprises communicate with each other. The convergence of voice and data into a single IP network creates a cost-effective transport mechanism that enables a new set of services. Voice, which was previously confined to a separate legacy network (e.g., PSTN), became ubiquitous and plays an integral role in communication among and bridging disparate entities. These entities include multiple users and user groups both inside and outside the enterprise, as well as advanced applications that enable communication with other entities anywhere, anytime with any device. The converged VoIP, UC and CEBP solutions need to comply with a myriad of protocols, applications and devices including the ones on legacy voice networks. These compliance requirements expose the convergent solutions to threat vectors that emanate from multiple entry points and pose formidable challenges with security and reliability.

SUMMARY

A method and system for unified communications threat management (UCTM) for converged voice and video over IP is disclosed. A computer-implemented method for threat management receives an incoming packet. The incoming packet is broken into sub-packets and fed to a plurality of packet processing engines. Each packet processing engine inspects the sub-packets and annotates the sub-packets with meta-data. The annotated sub-packets are combined and processed by a plurality of application engine to generate a processed packet. The processed packet is classified and stored in a database.

The above and other preferred features, including various novel details of implementation and combination of elements, will now be more particularly described with reference to the accompanying drawings and pointed out in the claims. It will be understood that the particular methods and circuits described herein are shown by way of illustration only and not as limitations. As will be understood by those skilled in the art, the principles and features described herein may be employed in various and numerous embodiments without departing from the scope of the invention.

BRIEF DESCRIPTION OF THE DRAWINGS

The accompanying drawings, which are included as part of the present specification, illustrate the presently preferred embodiment of the present invention and together with the general description given above and the detailed description of the preferred embodiment given below serve to explain and teach the principles of the present invention.

Figure 1:
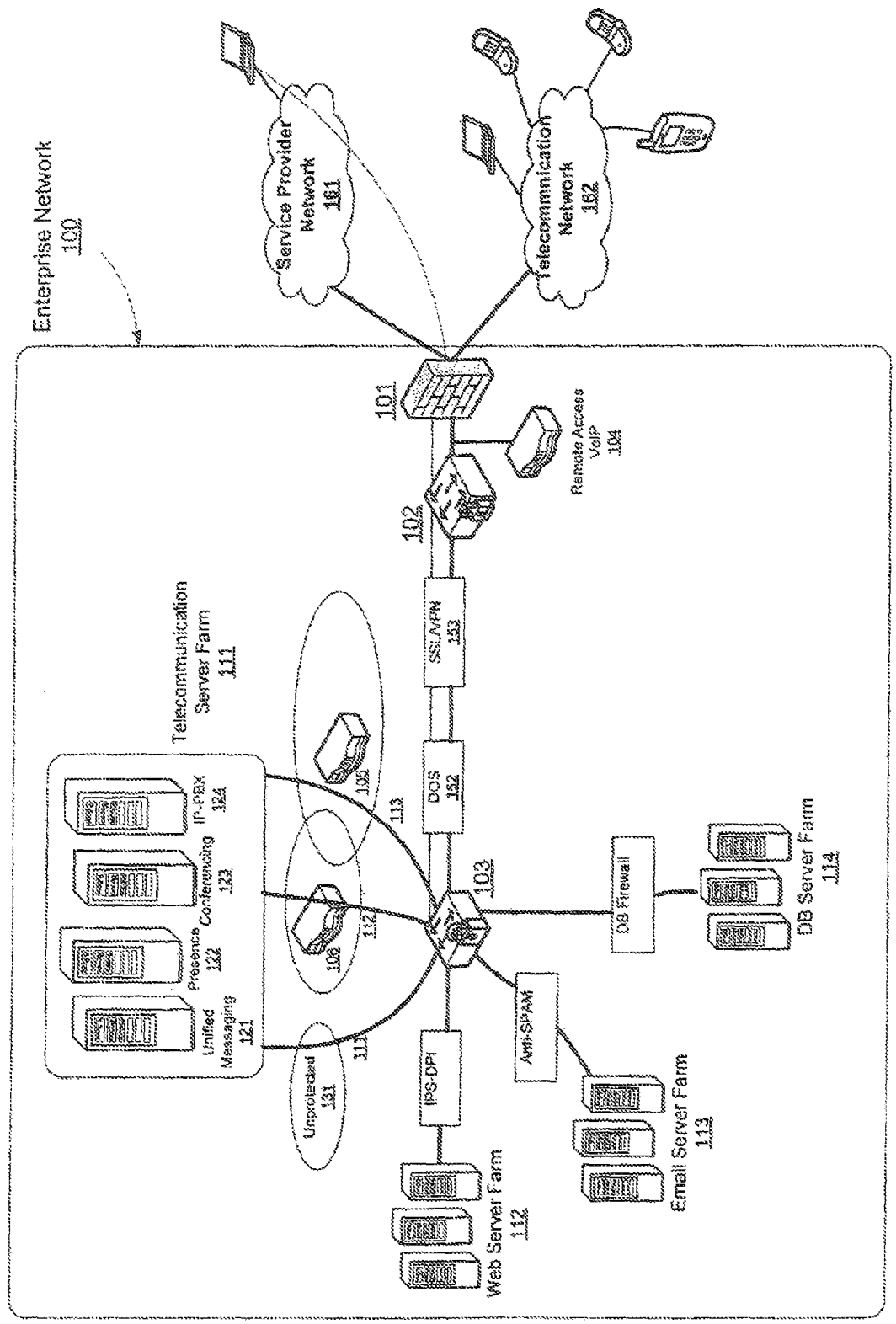
FIG. 1 illustrates an exemplary enterprise network including various server farms, according to one embodiment.

It should be noted that the figures are not necessarily drawn to scale and that elements of similar structures or functions are generally represented by like reference numerals for illustrative purposes throughout the figures. It also should be noted that the figures are only intended to facilitate the description of the various embodiments described herein. The figures do not describe every aspect of the teachings disclosed herein and do not limit the scope of the claims.

DETAILED DESCRIPTION

A system and method for Unified Communications threat management (UCTM) for converged voice and video over IP is disclosed. Each of the features and teachings disclosed herein can be utilized separately or in conjunction with other features and teachings to provide a method and system for UCTM for converged voice and video over IP. Representative examples utilizing many of these additional features and teachings, both separately and in combination, are described in further detail with reference to the attached drawings. This detailed description is merely intended to teach a person of skill in the art further details for practicing preferred aspects of the present teachings and is not intended to limit the scope of the claims. Therefore, combinations of features disclosed in the following detailed description may not be necessary to practice the teachings in the broadest sense, and are instead taught merely to describe particularly representative examples of the present teachings.

In the following description, for the purposes of explanation, specific nomenclature is set forth to facilitate an understanding of the various inventive concepts disclosed herein. However, it will be apparent to one skilled in the art that these specific details are not required in order to practice the various inventive concepts disclosed herein.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but is not limited to, any type of disk including floppy disks, optical disks, CD-ROMs, and magnetic-optical disks, read-only memories, random access memories, EPROMs, EEPROMs, magnetic or optical cards, or any type of media suitable for storing electronic instructions, and each coupled to a computer system bus.

The methods presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

FIG. 1 illustrates an exemplary enterprise network including various server farms such as telecommunication server farm 111, Web server farm 112, email server farm 113 and database server farm 114, according to one embodiment. Telecommunication server farm 111 includes unified messaging (UM) server 121, presence server 122, conferencing server 123 and IP-PBX server 124. UCTM system 105 is placed in front of telecommunication server farm 111 and acts as a proxy-gateway solution inspecting both inbound and outbound traffic. UCTM system 105 applies different security policies to an application running at a server farm in addition to binding the application to an user or a group of users. This allows for applying different security policies at various endpoints depending on the trust level of the entry user group. For example, user groups whose identity are known a priori such as a mobile office employee or OEM partner connecting through Skype or SSL-VPN access may benefit from services providing flexible security policies.

Communication flows arrive at the forefront of enterprise network 100 from various external networks including service provider network 161 and telecommunication network 162. Such communication flows may arrive at firewall 101 from network devices or nodes having intention for security attack. Some types of security attacks are blocked or filtered by a series of enterprise routers 102, 104, Denial of Service (DOS) protection 152 or Secure Sockets Layer protection 153.

A typical UC service such as a Web conferencing session hosted by conferencing server 123 requires a valid registration, and communication flows potentially spanning multiple server farms. In particular, communication flows to telecommunication servers are subject to various levels of protection; communication flows 111 indicate unprotected 131 communication flows. Communication flows 113 are protected by UCTM system 105 whereas communication flows 112 are protected by other vendors 106 for existing applications/servers, typically dedicated to a single application/server.

Figure 2:
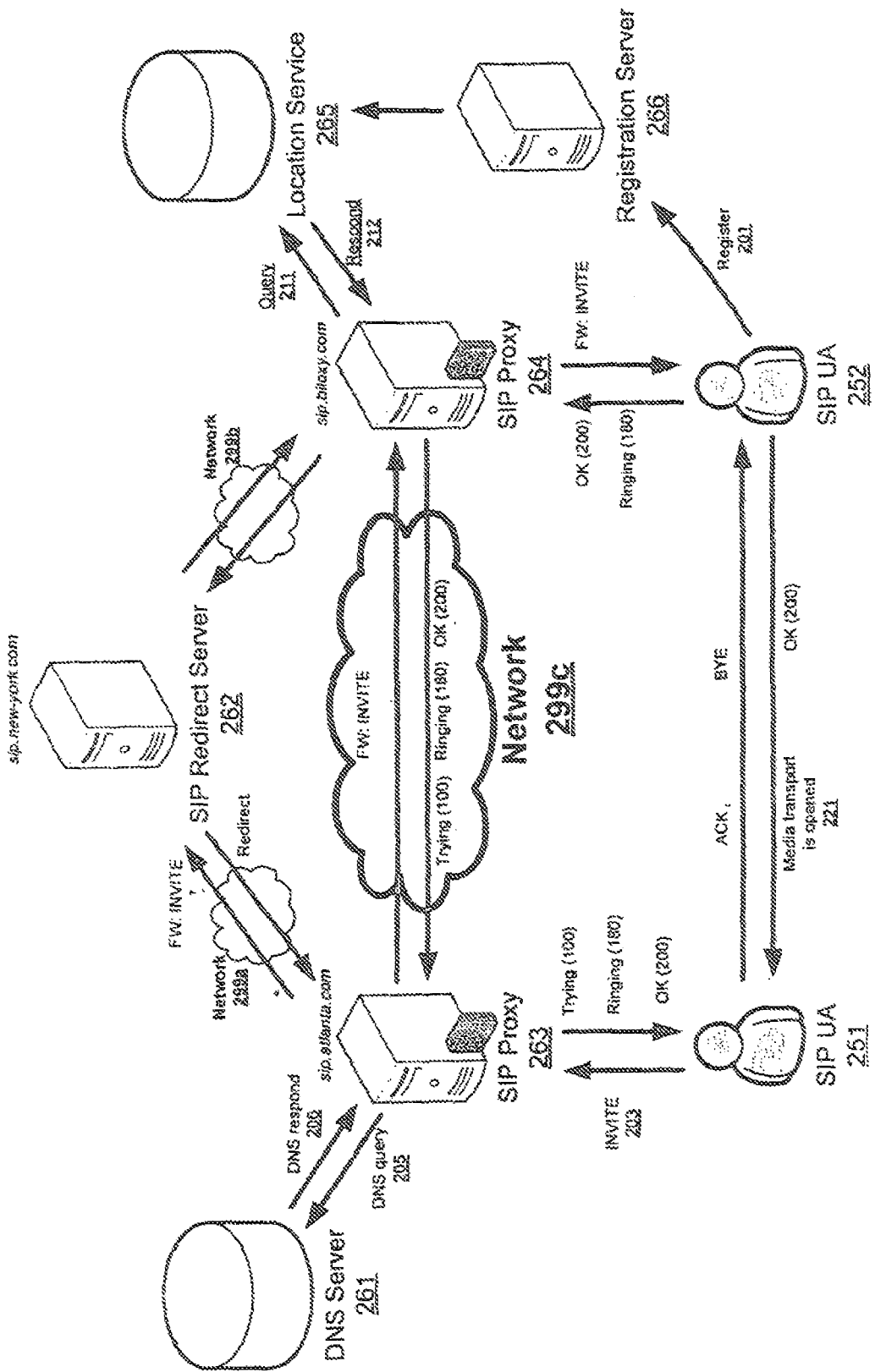
FIG. 2 illustrates an exemplary Session Initiation Protocol (SIP) flow involving a SIP call, according to one embodiment.

FIG. 2 illustrates an exemplary Session Initiation Protocol (SIP) flow involving a SIP call, according to one embodiment. User Agent (UA) 251 (sip:alice@atlanta.com) calls another UA 252 (sip:bob@biloxy.com). The SIP call starts with an INVITE message 203 from UA 251 to UA 252. SIP proxy server 263 (sip.atlanta.com) queries DNS server 261 to resolve UA 252's domain (biloxy.com) via 205 and 206 and requests SIP redirect server 262 to redirect UA 251's call request when UA 252 is outside the range of the SIP proxy server 263. After UA 251's call request arrives (sip.biloxy.com) either via SIP proxy server 263 or SIP redirect server 262 over network 299 (299*a*, 299*b*, 299*c*), SIP proxy server 264 queries (211, 212) location service 265 to resolve UA 252's internal address. UA 252's phone rings 214 and, when followed by an affirmative response by UA 252, the media connection flow is directly established 221 between UA 251 and 252.

UA's devices (phones, PDAs, etc.) are registered with a registration server prior to using SIP calls. For example, UA 252's phone number is registered 201 with registration server 266 and its registration information is stored in location service 265. When an incoming call arrives, SIP proxy server 264 queries (211, 212) location service 265 to identify UA 252's phone number where the incoming call is redirected to.

Unified Communication threat management (UCTM) is a highly specialized solution designed for providing complete protection, visibility and control for voice-, video-, and multimedia-over-IP traffic. According to one embodiment, UCTM system 105 performs a blended approach to security combining stateful inspection, protocol anomaly detection and intrusion prevention with application-aware techniques such as voice Denial-Of-Service (DOS) protection, voice SPAM prevention and threat protection and policy enforcement for UC and CEBP applications. In addition, UCTM system 105 meets real-time traffic needs of the UC services. As a result, UCTM system 105 combines security services for data and voice to provide not only comprehensive protection against a plethora of voice, video and multimedia IP threats but also complete control and visibility of real-time traffic.

According to one embodiment, UCTM system 105 satisfies five categories or criteria to effectively address VoIP/UC security and deployment challenges.

Category I (real-time requirements) requires high reliability. For example, 99.999% uptime having less than 5 minutes of downtime per year needs to be guaranteed. In addition, real-time requirements also include low latency for media and signaling and stringent Quality-of-Service (QoS) jitter having less than 100 microseconds for media and 2 milliseconds for signaling.

Category II (security requirements) requires low tolerance to false-positives and false-negatives. Under this category, call re-attempts are not acceptable. UCTM system 105 employs encrypted traffic (e.g., SIP/TLS, SRTP).

Category III (technology requirements) requires capabilities for deep packet inspection from Layer 3 to Layer 7 VoIP and UC traffic. UCTM system 105 employs a heterogeneous architecture having both pro-active and reactive solution elements. It also maintains multiple levels of call state with adaptive behavioral learning of both UC applications and VoIP endpoints. It further provides advanced correlation of protocol state with security events across the different layers and security modules. Category III requirements comprehensively address VoIP, UC and CEBP application security threats such as SIP/SCCP/H.323 protocol anomaly detection, Intrusion Prevention System (IPS), voice DOS and SPAM over Internet Telephony (SPIT) prevention, eavesdropping, toll fraud, number harvesting, Man-in-the-middle (MITM) attacks as well as UC-aware policy and incident management system.

Category IV (enterprise focus) requires deeper interoperability with disparate systems. Complex services spanning multiple protocols are employed. UCTM system 105 employs zero-touch deployment requirement under this category.

Category V (UC and CEBP communications focus) requires tight integration with IP-PBX and other communication infrastructure elements for the ease of deployment and manageability. Third party vendor solutions providing UC and SOA services (e.g., Microsoft, SAP, BEA, IBM) are easily integrated. Under Category V, all VoIP and UC traffic are visible, and controls of all UC services, applications and assets are provided.

Intrusion Detection System (IDS) and Intrusion Prevention System (IPS) vendors are strong in enterprise focus (Category IV) but are not well suited to meet real-time requirements (Category I). They have a high degree of false-positives (Category II) and lack technological elements (e.g., advanced call state correlation) required to address complex blended threats that may span multiple VoIP/UC protocols (Category III). Conventional data security solutions also lack UC and CEBP communication focus (Category V).

UTM vendors provide solutions that are very similar to that of IDS/IPS vendors but lack best-of-breed solution and technological elements. They provide solutions that are better suited for price sensitive small and medium businesses (SMB) at a significantly lower price. UTM devices are mired in performance related issues and do not provide solutions under Categories II, III and V.

Session Border Controller (SBC) vendors provide security solutions that are very strong in Category I (real-time) and adequate for carrier and edge (or border) protection deployments. They are, however, not enterprise-focused, therefore lack the necessary technological and solution elements required for providing adequate UC and CEBP application security (Categories III, IV and V).

Existing IP-PBX players are primarily focused on providing end-user voice solutions and equipment. Their solutions are strong in real-time (Category I), enterprise (Category IV) and UC focus (Category V) but are not focused on providing security solutions (Category II and III).

Conventional security solutions such as IDS/IPS appliances, network firewalls, UTM and/or SBC vendors are not well suited for addressing the complex VoIP and UC security requirements and deployment challenges.

Figure 3:
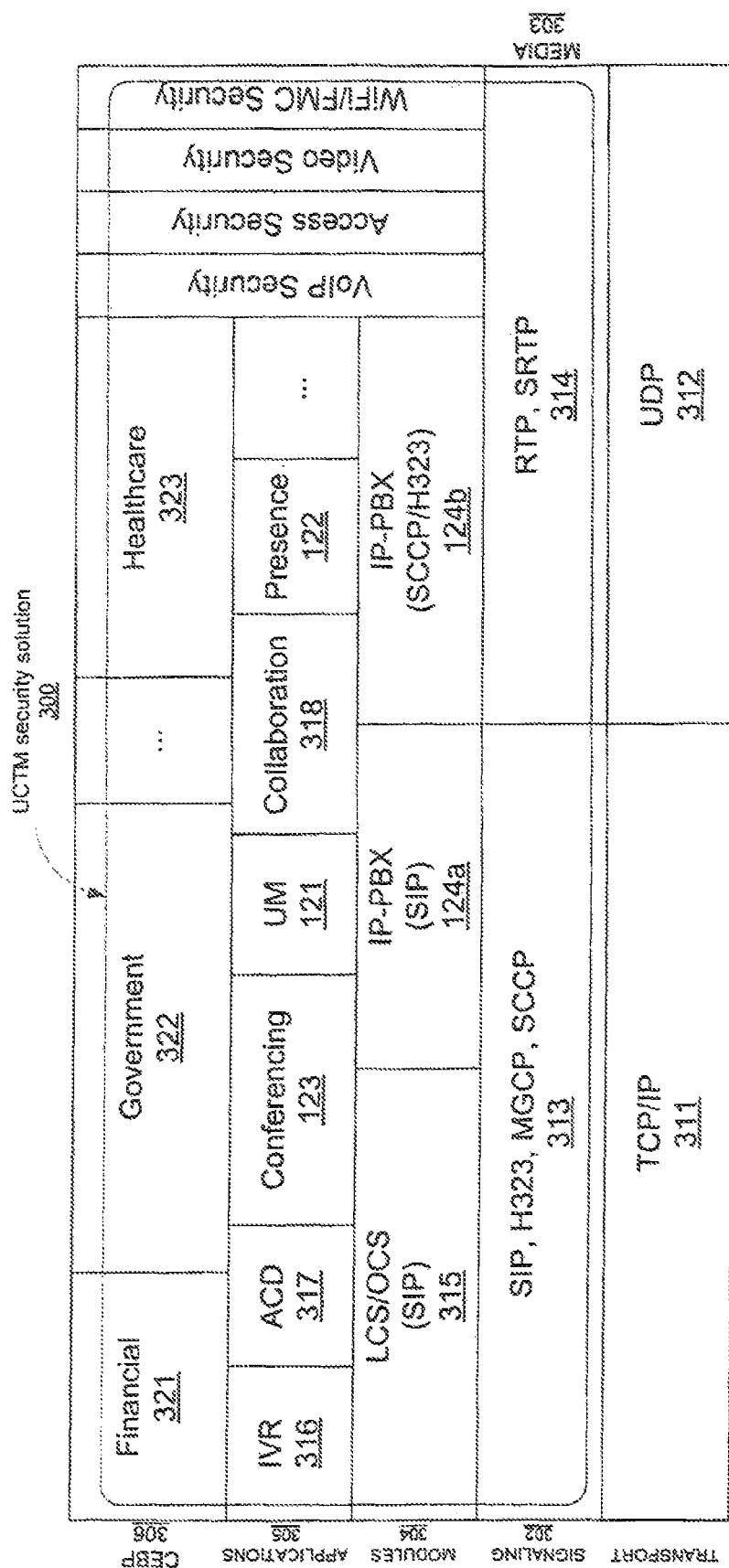
FIG. 3 illustrates an exemplary UCTM security solution that correlates protocol, endpoint and application transaction states across signaling, media, modules, applications and Communications Enabled Business Process (CEBP), according to one embodiment.

FIG. 3 illustrates an exemplary UCTM security solution 300 that correlates protocol, endpoint and application transaction states across signaling, media, modules, applications and CEBP, according to one embodiment. Signaling layer 302 includes VoIP protocols 313 such as SIP, H.323, Media Gateway Control Protocol (MGCP) and Skinny Call Control Protocol (SCCP) as well as media protocols 303 such as Real-time Transport Protocol (RTP) and Secure RTP (SRTP) protocols 314. Modules 304 include communications servers 315 such as Office Communications Server (OCS), Live Communications Server (LCS) and IP-PBX servers 124. Exemplary UCTM applications 305 include Interactive Voice Response (IVR) 316, Automated Call Distribution (ACD) 317, conferencing (Web or voice) 123, Unified Messaging (UM) 121, collaboration 318 and presence applications 122. CEBP applications 306 are tailored for unique business processes such as financial 321, government 322 and healthcare applications 323. Current solutions are limited to individual silos but UCTM security solution provides a unified solution across signaling, media, modules, applications and CEBP layers. For example, a communication signal without deep packet inspection and stateful analysis results in an attack that is not correctly identified or detected.

Several thousand threats for VoIP have been compiled from various sources, such as VOIPSA group, CERT, BugTraq and other vulnerability postings from several vendors. VoIP deployment is hampered by a variety of threats at different entry points and attack vectors that exploit weaknesses. Such weaknesses exist in network layer, underlying OS, network protocol, application layer and/or device configuration.

Figure 4:
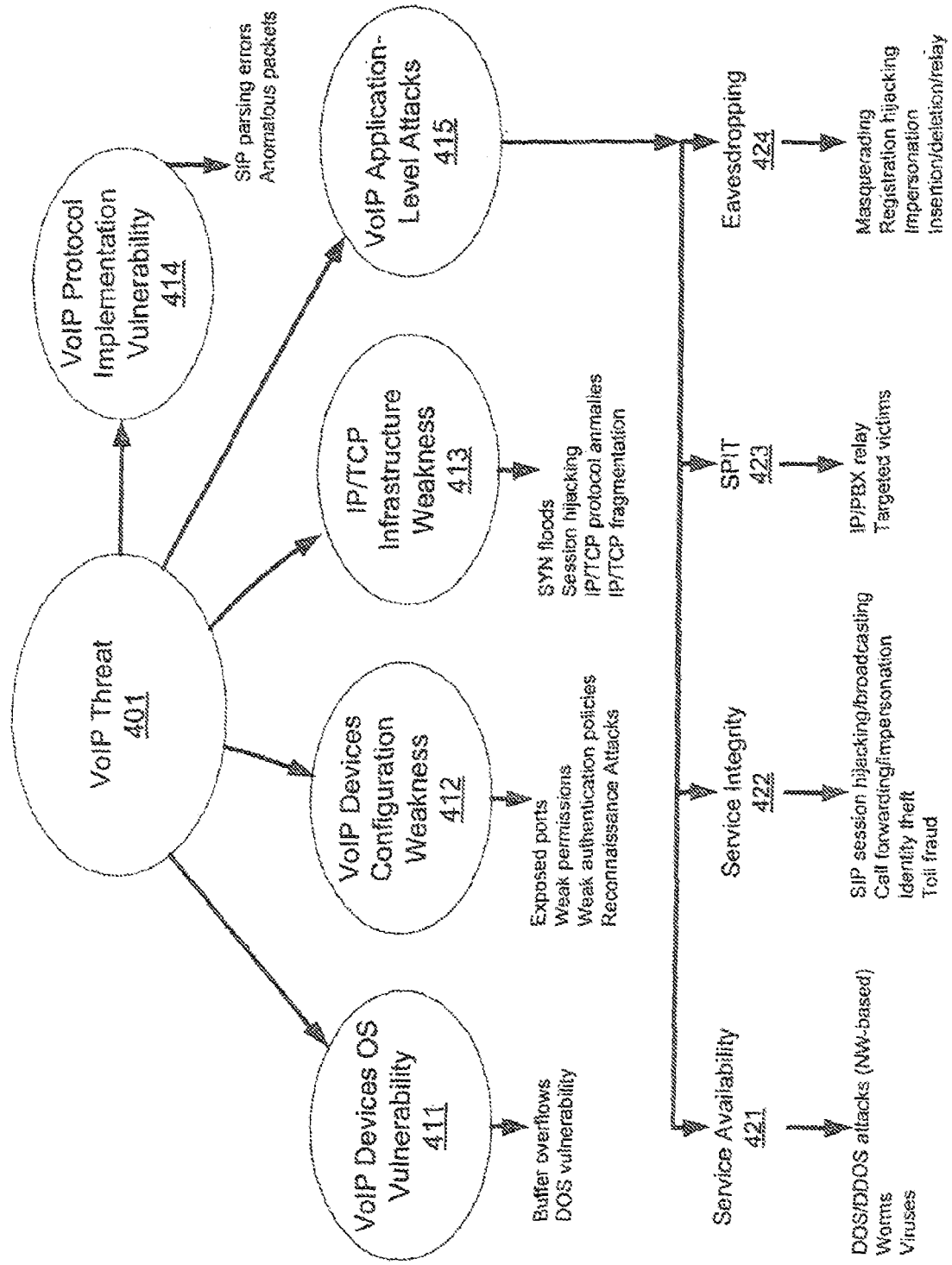
FIG. 4 illustrates exemplary VoIP threats categorized by common attack types with similar entry methods and common vulnerability exploitation, according to one embodiment.

FIG. 4 illustrates exemplary VoIP threats 401 categorized by common attack types with similar entry methods and common vulnerability exploitation, according to one embodiment. Categorizing VoIP threats helps better understand various VoIP threat vectors such that a common effective security solution for each category is formulated.

VoIP device OS vulnerability 411 includes VoIP threats from VoIP devices such as IP phones, call managers, gateways, registration and other proxy servers run an operating system (OS). Compromise of the underlying OS leads to an integrity compromise of the VoIP device running the OS. Most of the VoIP devices run on traditional operating systems (e.g., Windows, Linux, RTOS) that are vulnerable with numerous exploits that are publicly available. For example, buffer overflow against a device OS is a well-known attack exploiting VoIP Device OS vulnerability. Denial-of-Service (DoS) triggered by fragmented UDP packets is another example under this category.

VoIP device configuration weakness treats 412 refer to the threats penetrating through VoIP infrastructures due to weaknesses in configurations such as open TCP/UDP ports, open file shares with global read/write permissions or temporary folders with weak permissions, etc. As a result, the services running on the VoIP device become vulnerable to a wide variety of attacks resulting in either a loss of service or a compromise of the VoIP device. For example, a known SIP-based phone telnet service allows the telnet service to be exploited by an attacker due to weak password permissions set on the VoIP device. In addition, Simple Network Management Protocol (SNMP) services offered by the VoIP device are vulnerable to reconnaissance attacks, and valuable information is gathered from an IP phone by using SNMP queries with the "public" community name.

IP/TCP infrastructure weakness threats 413 rely on transport protocols such as TCP/IP 311 or UDP 312. The availability of a VoIP/UC service depends on the availability of the underlying IP/TCP infrastructure. VoIP protocols rely on TCP and UDP as transport mediums and hence are also vulnerable to attacks that TCP and UDP are generally exposed to such as DOS/DDOS, session hijacking, protocol anomalies, etc. and cause an undesirable behavior on the VoIP services.

VoIP protocols implementation vulnerability threats 414 rely on the VoIP protocols such as SIP, H.323 that are relatively new standards. Both the protocol specifications and the subsequent implementations need to mature to reduce the overall threat exposure. Examples include parsing errors, NULL packets, anomalous packets, RFC violations etc. Several vulnerabilities are discovered in vendor implementations of VoIP products that use H.323 and SIP.

According to one embodiment, VoIP application-level threats 415 are grouped into the following four categories based on various entries and injection mechanisms: service availability attacks 421, service integrity attacks 422, SPAM over Internet Telephony (SPIT) 423 and eavesdropping attacks 424.

Service availability attacks 421 are focused on disrupting the availability of VoIP services. The unavailability of a critical service has a direct customer impact, lost revenues, unplanned downtimes and maintenance costs. Such examples include VDOS attacks, remote code injection and viruses or worm-based threats. The affected clients are end-user VoIP applications, phones, soft-clients, call managers, registration servers, etc. Due to the real-time nature of VoIP applications, any disruption in service causes tremendous business impact including financial loss and loss of productivity.

Service integrity attacks 422 are focused on compromising the integrity of VoIP services. These attacks are very targeted and usually difficult to detect. These attacks ruin the reputation and brand name of the service provider, and result in leakage of sensitive information by phishing attacks. Some examples of service integrity attacks include collaboration session hijacking, redirecting existing media conversations to an attacker's machine, classic man-in-the-middle (MITM) attack, broadcast hijacking, identity theft, conversation alteration, impersonation and toll fraud.

SPIT attacks 423 impose potential threats like its email counterpart. With increasing deployment of IP solutions, SPIT is expected to be an attractive choice for spammers due to its low cost and pervasiveness of the Internet. Conventional SPAM methods adopted by telemarketers require a human presence manually dialing the phone numbers and making the voice connections. This attack pattern is drastically changed with IP networks, as even a simple computer script can flood vulnerable corporate phone systems with SPAMs.

Eavesdropping attacks 424 allow attackers to obtain sensitive business or personal information otherwise deemed confidential. The eavesdropping mechanism exploits intercepting and reading of messages and conversations by an unintended party. Once the information is collected and translated, various Man-in-the-Middle (MITM) attacks can be launched (e.g., reading, inserting, modifying the intercepted messages). Some examples include masquerading, registration hijacking, impersonation and replay attacks.

The last decade has seen a rise in several best-of-breed point security products to overcome the challenges presented by ever changing threats including network firewalls, SSL VPN appliances, DOS protection, anti-virus, IDS/IPS, anti-SPAM and content filtering solutions. All of these point products provide best-of-breed protection for the threats that they are well adept with. However, these products typically work in isolation in the network with limited end-to-end system visibility and control. Oftentimes, the Layer 3-7 networking stack functions are executed multiple times without good inter-communication between them. In addition, each product provides its own management console presenting unique challenges for effective end-to-end network configuration with correct policies.

Deployment and management of these point products became a big challenge for enterprise networks. This leads to the rise of Unified Threat Management (UTM) solutions that provide several of the above features in a single box. In general, deploying a single multi-function device reduces costs and overall management. Each of the security functions works in loosely coupled form but the common UTM framework provides a central management console of managing and configuring the product. There are widely perceived deployment challenges faced by current UTM solutions: performance bottlenecks, scalability, not best-of-breed solutions, architectural limitations and reliability. Current UTM solutions are also very much limited to enterprise data networks.

Voice/video, multimedia and other Unified Communications (UC) pose a different set of challenges. Real-time communication mandates high reliability and requires near perfect latency, low jitter with near-zero false-positives and negatives. The real-time requirements present challenges for conventional enterprise-focused UTM solutions that are deployed in data-centric networks.

Figure 5:
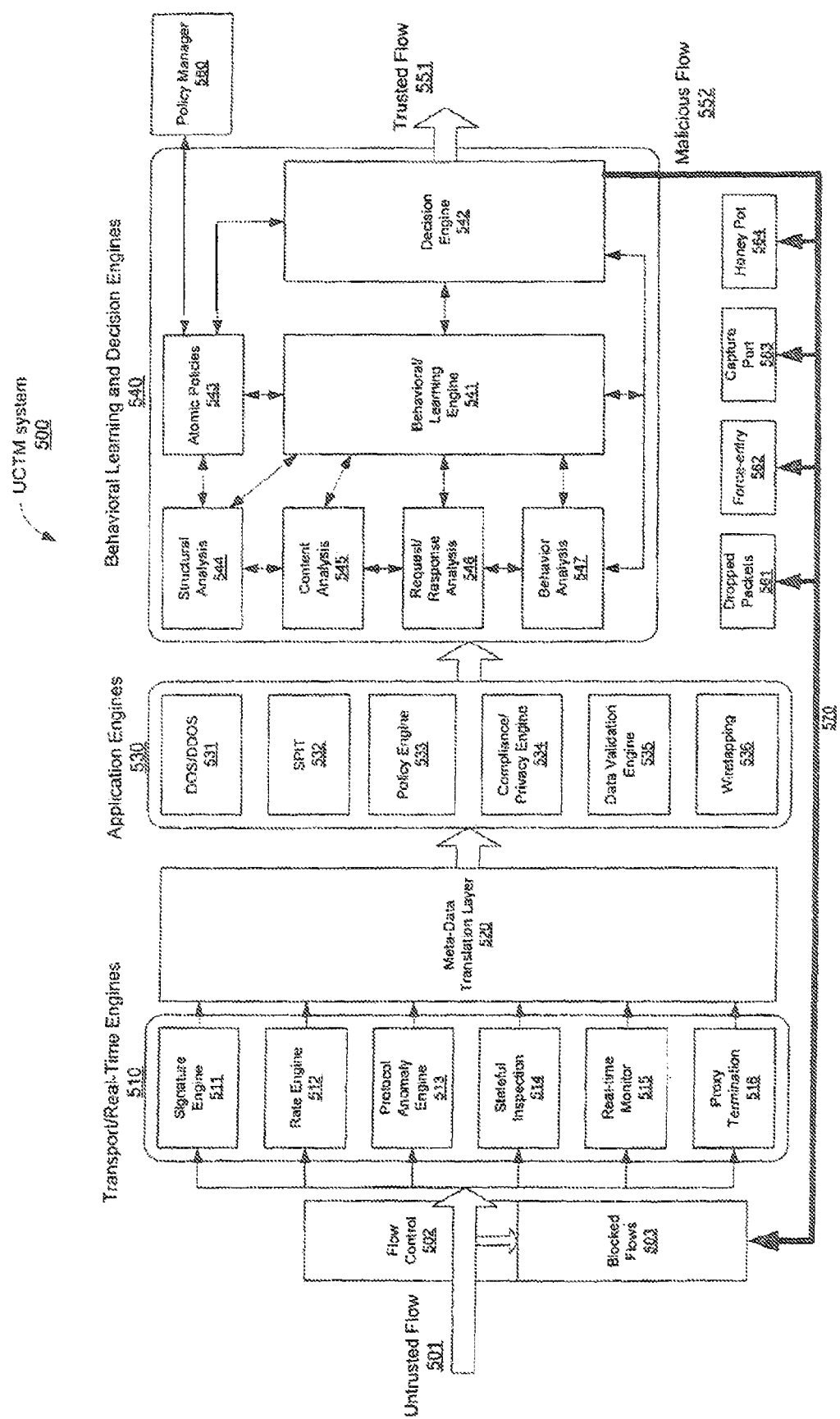
FIG. 5 illustrates an exemplary architecture for a Unified Communications threat management (UCTM) system, according to one embodiment.

FIG. 5 illustrates an exemplary architecture for Unified Communications threat management (UCTM) system, according to one embodiment. UCTM system 500 is applied to voice, video, multimedia and UC communications over IP. The underlying architecture adopts a layered defense approach using best-of-breed component technologies. UCTM system 500 continuously inspects data streams using real-time stream inspection engines that operate at transport, real-time and application layers. Meta-data translation layer 520 bridges the intelligence between transport/real-time layer and application layer to communicate events, results and statistics therebetween.

Incoming packet flows are inspected in the following processes. An untrusted flow that comes into the system is first passed to transport/real-time engines 510. Transport/real-time engines 510 have signature engine 511, rate engine 512, protocol anomaly engine 513, stateful inspection engine 514, real-time monitor engine 515 and proxy termination (B2B UA) engine 516. Incoming flow is broken into multiple sub-flows that are processed asynchronously and in parallel by the respective engines. Once the processing is done, each engine 511-516 adds meta-information to the flow annotating the results generated from its execution. Meta-data translation layer 520 combines all the meta-information coming from the various engines into a single fully annotated flow. The annotated flow is fed into application engines 530.

Application engines 530 have of Voice DOS/DDOS (VDOS/VDDOS) engine 531, SPIT engine 532, policy engine 533, compliance/privacy engine 534, data validation engine 535 and wiretapping engine 536. Application engines 530 operate on the fully annotated meta-information providing rich context to the communication. These application layer engines operate on the meta-data making them protocol agnostic.

The resultant flows are passed to behavioral learning (BL) and decision (BL&D) engine block 540 for further processing. BL&D engine block 540 further analyzes and processes the rich information in the meta-data that carries hints, recommendations, anomaly events, policy violations, alerts, etc.

According to one embodiment, an untrusted flow 501 is classified into one of two possibilities: trusted flow 551 and malicious flow 552. A trusted flow 551 requires no action and is sent to the backend servers for further processing. A malicious flow 552 requires further action guided by user-provided configurable remediation options. Exemplary remediation options include drop packets 561, force retry 562, capture port 563 and honeypot 564. Drop packets 561 include mechanisms that prevent malicious packets from proceeding further to backend communication servers. Force-retry mechanisms 562 challenge the incoming requests by specifying the credentials of the source of the request. Force-retry mechanisms 562 also include a retry mechanism which retries the original request after a time delay. Capture port 563 includes mechanisms that capture the identity of the originating source for further forensic analysis. Honeypot 564 includes mechanisms that route malicious flows to dedicated servers which store all the traffic- and endpoint-related credentials for later post-mortem analysis 503.

According to one embodiment, BL&D engine block 540 learns legitimate and anomalic flows, and records them into a database as unique and easily retrievable record entries. According to another embodiment, BL&D engine block 540 tags the processed and analyzed flows per-session, per-user, per-domain, per-application, per-user/application group to use them for constructing remediation policy.

The records carry a certain state about the hashed entry and provide rich context on its behavior and past usage. For example, an untrusted flow coming into the system but with a matching record entry is dropped instantaneously with no further action required by any upstream engines in transport/real-time layer, and meta-data translation layer 520 and application layer 640. The learned communication information is fed back to the flow control module 502 via 570 to provide a fast decision mechanism and to cut processing time of the processing engines.

Figure 6:
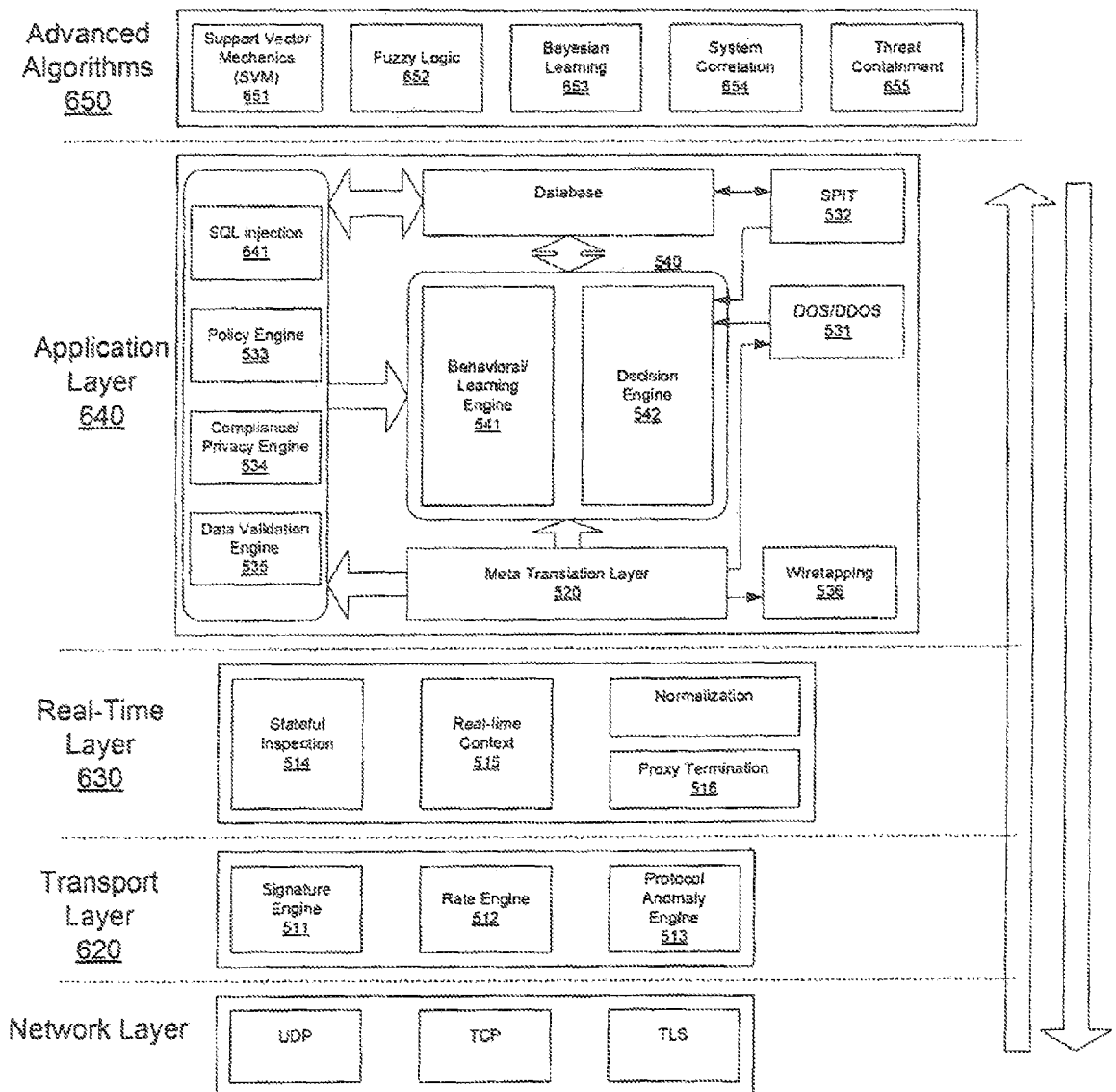
FIG. 6 illustrates a layered system architecture for an exemplary UCTM system, according to one embodiment.

FIG. 6 illustrates a layered system architecture for an exemplary UCTM system, according to one embodiment. According to one embodiment, the underlying OS is a hardened Linux stack with all the unnecessary optional functionalities stripped out. Unnecessary services from the OS are removed, and unnecessary ports and/or applications for accessing the Internet are blocked. Only certified services, ports and application are guaranteed to run while any other processes including processes for malicious intent are prevented and reported. Default least execution privileges are applied for all open and running services. Adequate buffer overflow protection is achieved by applying Address Space Layout Randomization (ASLR) techniques which involve randomization of the program and data address space to defeat code injection-based exploits which rely on certain key processes and/or libraries loaded at certain known addresses.

The present system and method prevents a wide variety of attacks targeting VoIP applications and infrastructure. The component engines include various engines in a layered architecture. Transport layer 620 includes signature engine 511, rate engine 512 and protocol anomaly engine 513. Real-time layer 630 includes stateful inspection engine 514, real-time monitor engine 515 and proxy-termination engine 516. Application modules layer 640 includes VDOS/VDDOS engine 531, SPIT protection engine 532, policy engine 533, compliance/privacy monitoring engine 534, data validation engine 535 and BL&D engine block 540. BL&D engine block 540 individually contains several modules 541-547 that are used to track VOIP/UC traffic and application activities.

Signature engine 511 provides reactive protection for vulnerabilities that are not protected by other continuous streaming engines. Reactive protection provides protection based on the signature of the source. A vulnerability server continuously monitors threats and vulnerabilities, and the signatures of the monitored threats are updated and become available to signature engine 511. Vulnerabilities in higher protocol stacks including SIP, SCCP, RTP. H.323 etc. that are not well addressed by continuous streaming engines are captured by signature engine 511. The vulnerability server periodically releases security advisories and signature updates for vulnerabilities that for some reason are not protected by continuous streaming engines. Customers using a UCTM system 105 download the signature updates from the UCTM system 105's website and get adequate protection coverage for critical and recent vulnerabilities affecting their communications infrastructure and systems.

Rate engine 512 is responsible for ensuring that packet flows conform to the specified rate flow constraints. For every incoming packet, rate engine 512 inspects the IP/port of the sender and checks to see if any prior address-of-record (AOR) entry exists. If a prior AOR entry exists, it increments a rate counter based on the time of the previously received message. Rate engine 512 then checks to see if the updated rate counter has crossed any configured threshold based on the various parameters being monitored. If the updated rate counter does not exceed its corresponding threshold for the specific user (or an application), rate engine 512 processes the received packet to continue; otherwise rate engine 512 stops processing the packet further and blocks the connection flow concluding that the received packet is untrustworthy. If there is no prior AOR entry (i.e. new subscriber), rate engine 512 stores all user specific information into a new record entry (e.g., IP, port, call-ID, contact, contact sequence number (CSeq), date) with a rate counter initialized. According to one embodiment, a new user falls into one of three user profile categories, 'trusted user,' 'untrusted user' or 'unclassified user.'

According to one embodiment, rate engine 512 employs a suite of remediation steps when a rate counter exceeds a threshold. The received packet may be dropped immediately or after some time. A retry-after-mechanism may be enforced if the threshold continues to exceed indicating a DOS attack. Alternatively, all the incoming traffic from the user/user-group/domain/IP-range may be blocked.

According to one embodiment, each category has different threshold levels. For example, an untrusted user has a lower threshold value when compared to a trusted-user. Each user may be associated with a profile based on its IP/port, domain name or an AOR if their entries exist in the database.

According to one embodiment, rate engine 512's policies operate either at a user, system-level and are either static or real-time. Static policies may be enforced at either user-level or system-level. Rate counters are monitored at user-level counting call attempts per second, simultaneous calls open at a time, retransmissions per second. Additionally, specific message counters such as register counter, invite counter, response counter, error response counter or request counter are monitored against threshold values. At system-level, number of active sessions (or calls) number of new sessions created, number of peak sessions, number of sessions expired and message counters are monitored for violation of rate rules. According to another embodiment, dynamic policies are enforced at a specific date, time or hour. For example, at a specific time of the day or on a specific day of a week, call attempts per user or application are monitored. Dynamic policies may be enforced with a combination of date/time/hour rules.

Protocol anomaly engine 513 provides protection against malicious protocol message exploitations, forceful insertion of non RFC-compliant characters or state transitions that are undefined. Inadequate protocol anomaly protection may lead to simple denial-of-service (DoS) attacks. Exemplary attacks in this category include protocol fuzzing attacks, input fuzzing attacks, insertion of large anomalous packets, abnormal header or parameter fields.

In addition to protocol anomaly attacks, for protocols such as SIP, extensions to the base RFC draft from various VoIP vendors may raise issues with interoperability among various VoIP vendor products. This may result in unnecessary false-positives unless adequate intelligence is present which differentiates between a protocol anomaly attack and an interoperability issue.

According to one embodiment, any illegitimate control or invalid transitions detected by the protocol anomaly module 513 due to either bad inputs or non-conformant messages are silently recorded. All the state properties including connection, application and session properties are recorded in a proprietary meta-data format and sent to BL engine 541. BL engine 541 performs further analysis on the meta-data and presents its recommendations back to protocol anomaly engine 513. The recommendation action is also tied to global remediation policies 561-564 that block the traffic, redirect the traffic to honeypot or enforce authentication challenge.

According to one embodiment, the observed heuristics and steps are enforced by BL engine 541 as follows. The meta-data provides detailed information of all transport, session and application properties in a protocol agnostic form. If BL engine 541 detects no prior instance of the record, or a matching record found without an exact match of the current observed anomalic properties, BL engine 541 returns a legitimate error back to the client assuming that the request is a well behaved one by sending a request failure error (a 4xx error according to SIP). BL engine 541 internally scores all incoming requests into one of the three buckets; white list contains endpoints that are always detected to be well behaved, such that incoming requests from them are safe; black list contains endpoints that are detected to be bad and/or malicious; gray list refers to anything in between. BL engine 541 records the meta-data of an incoming request into the gray list when an assertive conclusion cannot be made whether the incoming request falls into either the white or black list. All gray list entities are intensively tracked and the bar for diagnosing bad activity from them is much higher when compared to white list entities. This puts this specific instance and endpoint in high visibility mode. If future instances of the same activity are detected, BL engine 541 immediately downgrades the identified record's status to the Black List category and sends an appropriate remediation event, for example, block, alert, redirection, ignore the endpoint for some time. BL engine 541 and protocol anomaly engine 513 communicate through meta-data and events with specific properties to take the appropriate actions.

Stateful inspection engine 514 runs a finite state machine (FSM) with full termination and proxy capabilities. The FSM is a SIP and SCCP-based logical entity that receives and processes INVITE messages as a user agent server (UAS). It also acts as a User Agent Client (UAC) that determines how the request should be answered and how to initiate outbound calls. Stateful inspection engine 514 maintains complete call state, can terminate and reopen new connections in both ingress and egress directions, encrypt and decrypt traffic and participate in all call requests.

Stateful inspection engine 514 implements the necessary logic to copy all the relevant headers from UAS to UAC and vice versa. Stateful inspection engine 514 may be configured to strip down (or rewrite) specific headers for security reasons. Stateful inspection engine 514 also keeps track of latency incurred (so far) and guarantees that signaling latency is less than or equal to 2 milliseconds and media latency is less than or equal to 100 microseconds.

Several real-time adjustments and tracking are performed by real-time monitor engine 515 to ensure that the above properties are not compromised. Specific asynchronous timer events are triggered and monitored as new work items and engines are invoked and completed. Real-time monitor engine 515 is fully distributed and has the capability to open and track several live timer counters in parallel at any instance. If the observed time for a specific connection flow exceeds the thresholds, real-time monitor engine 515 has full control to terminate the victim task and allows the original connection flow to proceed with the best security decision under the given circumstances. If enough slowness is observed for a large number of connection flows, real-time monitor engine 515 backpressures flow control module 502 to stop processing future incoming requests until satisfactory thresholds are observed.

Meta-data provides an unified container mechanism by which different protocol parsed state values are translated into, hence providing a common representation layer for higher application modules to operate upon. According to one embodiment, a base meta-data container includes name, AOR entries such as SRC-IP/SRC-URL, SRC-PORT, DEST-IP/ DEST-URL DEST-PORT, DATE, CONTACT CALL-ID, CSEQ, PROTOCOL, METHOD, VERSION. In addition, user profiles and pointers to processing engines (e.g., signature engine 511, DOS/DDOS engine 531, SPIT engine 532) and external pointers to registration and location data contained in the base meta-data container.

According to one embodiment, the present system and method detects and protects against a suite of voice and data denial-of-service (DOS/DDOS/VDOS/VDDOS) attacks referred to as DOS attacks. DOS attacks are typically one of the two kinds: resource starvation or resource unavailable. Resource starvation usually occurs due to flooding attacks originating either from a single source or multiple sources. An attacker may flood the destination server with several control packets hogging significant CPU bandwidth making the server totally unusable. A DDOS attack is a variant of DOS, whereby the attacker uses multiple sources to collectively generate and send an excessive number of flood packets to the victim server, often with fake and randomized source addresses, so that the victim server cannot easily identify the flooding sources. The second attack type, resource unavailable, exploits a specific vulnerability (e.g., buffer overflow attack, malformed or fuzzed inputs) on one of the networking facing processes resident on the victim server, thereby making it unusable. This often leads to a crash or an undesirable situation.

According to one embodiment, the present system and method uses a deep protocol handshake behavior that server-client and peer-to-peer Internet applications adhere to. Based on these distinct network protocol behaviors, instead of monitoring just traffic rates, combined with advanced statistical algorithms, the present system and method accurately detects any aberrations that violate the baseline property by employing Change Point Monitoring (CPM) methods. The rationale behind the CPM is that there exists a strong positive correlation between requests (data) and the corresponding acknowledgment replies (ACKs), as specified by the protocol definition, and DOS/DDOS attacks easily violate this property. The non-parametric CUmulative SUM (CUSUM) method, widely used in the mathematical world, detects cumulative effect of the deviation from normal protocol behaviors caused by a DOS/DDOS attack.

According to one embodiment, the present system and method employs SPIT prevention. The goals for SPIT prevention are achieving near-zero false positives so that normal calls go unperturbed. Tolerable false negatives are also achieved by minimizing SPIT calls going through. SPIT prevention provides zero-touch solutions that involve minimal interaction with the caller/callee to determine whether a call is SPIT. Alternatively, one-touch solutions involve interaction with the callee (or caller) on a case-by-case basis. SPIT prevention is desired to be deployed with ease to suit different environments (e.g., office, home or remote) and to suit continual flux in an operating environment where new phones are added or removed or applications are deployed or downgraded. The SPIT prevention system combines the capabilities offered by individual component methods so that the resulting system is able to efficiently block SPIT calls with high fidelity and minimal callee (or caller) interaction.

Most attacks are initially preceded from reconnaissance or network and application discovery attacks. Specifically constructed attacks to a target network that is not equipped with adequate protection may reveal sensitive information about the network, such as servers, OSs, applications, patch version, VoIP endpoints, etc.

Application topology hiding is a relatively new concept in the VoIP world and is a very useful defense mechanism to thwart any kind of reconnaissance-(or information gathering) based attacks. These attacks usually run as pre-cursors to understand VoIP deployments and exploit publicly known vulnerabilities against those infra-structure items.

To that effect, any sensitive information that is a response from a server application either points to a topology server or is replaced with "xxxx". The topology server internally stores the data and rewrites specific tag items. For example, sensitive information that is protected by SPIT protection engine 532 include URIs/headers and parameter information, UC servers (e.g., IP-PBX 124, LCS/OCS, conferencing 123, collaboration, presence 122), phone extensions, user, user-groups, ports, any sensitive text or reference to VoIP installations, codec info, device IDs and phone numbers, and UC services (e.g., find-me, follow-me, click-2-call).

BL engine 541 and decision engine 542 provide a single focal point for all security decisions. Individual recommendations, events and hints presented by other engines/modules working independently are further analyzed by these two engines to reduce false-positives and produce a high fidelity result.

BL engine 541 is responsible for learning legitimate endpoint and application behavior in a transparent and non-intrusive way. BL engine 541 comprises four phases, (1) structural analysis, (2) content analysis, (3) request/response traffic analysis and (4) behavioral analysis.

Decision engine 542 adopts an unified threat assessment (UTA) methodology to correlate various meta-data information (or hints, recommendations) passed from other engines/ modules in an attempt to reduce false-positives and produce a result with high fidelity. Decision engine 542 makes the final decision, for example, whether to block, quarantine, allow or redirect (honeypot) the malicious flow stream. According to one embodiment, these options are user-configurable.

Numerous advanced algorithms 650 ranging from Support Vector Mechanics (SVM) 651, fuzzy logic 652, Bayesian algorithms 653 and Hellinger distances are initially used to baseline the normal behavior and compared against runtime behaviors, i.e. per-session, per-endpoint, per-application, per-group etc 654, 655.

According to one embodiment, decision engine 542 works very closely with the remediation engines 561-564. Numerous remediation techniques may be adopted. Ping tests verify the origination sources for accurate detection of automated war-dialing tools. Honeypot mechanism redirects suspicious activity, voice VLAN isolation. Traffic originating from the suspicious source (i.e. if traffic is coming inline) may be shut down. Authentication is strongly challenged and enforced using authenticated identity bodies.

With the true convergence of voice, video and multimedia over IP, threats coming from the data side may affect voice endpoints and systems. In the past, data and voice have operated in separate isolated networks with minimal interactions therebetween, however deployment of VoIP continues to converge voice and data.

Data validation engine 535 is responsible for ensuring that all user inputs and sensitive fields in the stream are validated with syntax rules. Most common types of attacks in this category are buffer overflow attacks, SQL injection and cross-site scripting attacks. Buffer overflow attacks may be prevented by enforcing standard length limits on all tag elements with exceptions to override some on a case-by-case basis. Data validation engine consults BL engine 541 for recommended and best practice enforced values for a specific data value item. BL engine 541 learns a priori legitimate length limits, data types, allowable ranges for all protocol and application message elements. Data validation engine enforces that these properties observed by BL engine 541 are never violated. Exemplary properties that are observed and enforced are the presence of meta or script characters (e.g., ',{,},<script>) in the header of the flow stream, content-length exceeding 1000 characters and the presence of malicious SQL keywords (e.g. SELECT UNION*)

Policy manager 560 provides a framework by which UC-aware policies are easily defined and enforced. Policies are applied at three different handles: users to user, user to application or vice-versa, and application-to-application.

Policies contain various control handles: control of the UC services that an user/user-group is entitled to, control of APIs that an application can invoke, control of authentication, encryption and codec policies, control of application/application-groups to which user/user-groups are visible, and control of the policies that are enforced at a specific time component.

Figure 7:
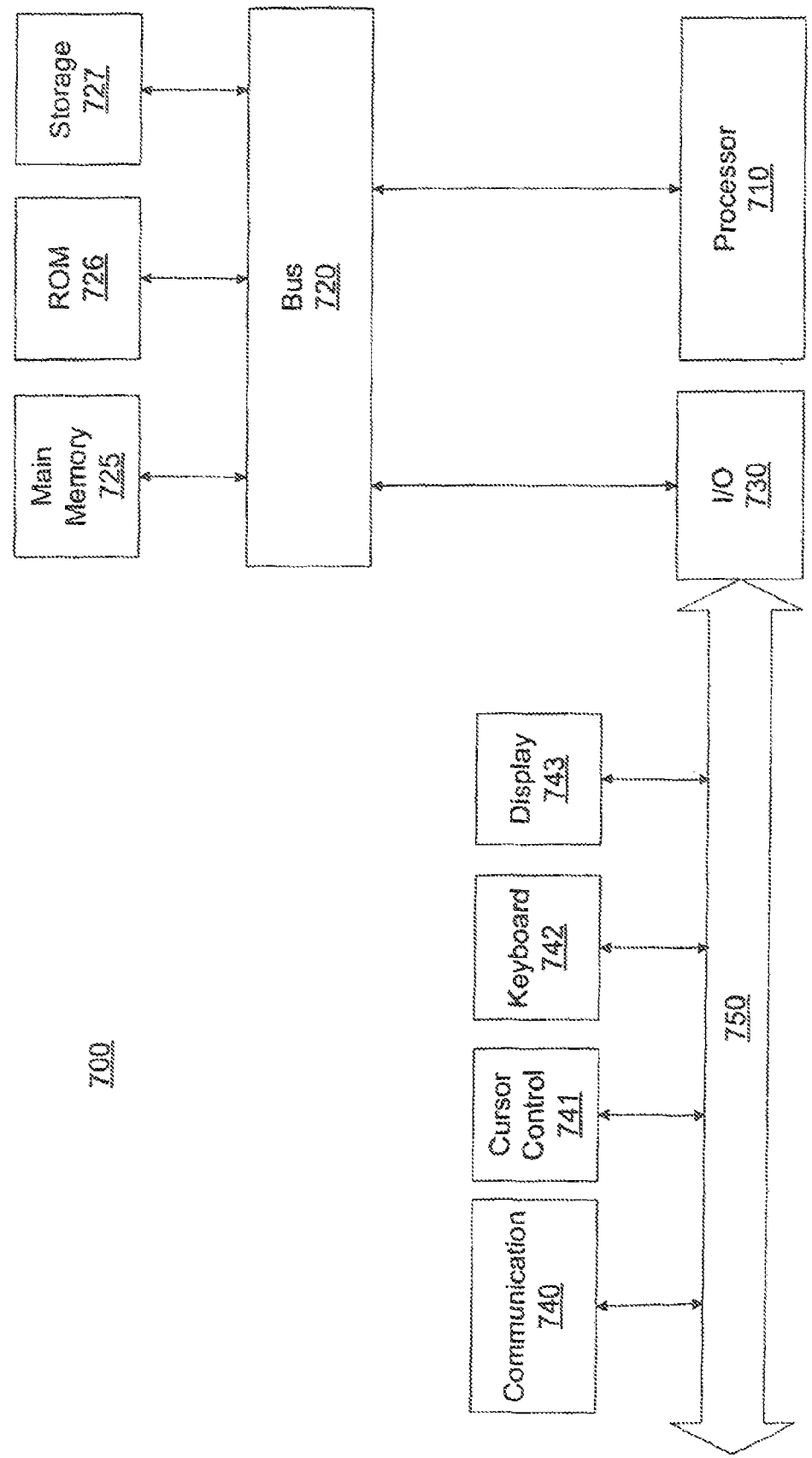
FIG. 7 illustrates an exemplary computer architecture for use with the present system, according to one embodiment.

FIG. 7 illustrates an exemplary computer architecture 700 for use with the present system, according to one embodiment. Computer architecture 700 can be used to implement a UCTM system 105 with all or a part of the components shown in FIG. 7. One embodiment of architecture 700 comprises a system bus 720 for communicating information, and a processor 710 coupled to bus 720 for processing information. Architecture 700 further comprises a random access memory (RAM) or other dynamic storage device 725 (referred to herein as main memory), coupled to bus 720 for storing information and instructions to be executed by processor 710. Main memory 725 also may be used for storing temporary variables or other intermediate information during execution of instructions by processor 710. Architecture 700 also may include a read only memory (ROM) and/or other static storage device 726 coupled to bus 720 for storing static information and instructions used by processor 710.

A data storage device 727 such as a magnetic disk or optical disc and its corresponding drive may also be coupled to computer system 700 for storing information and instructions. Architecture 700 can also be coupled to a second I/O bus 750 via an I/O interface 730. A plurality of I/O devices may be coupled to I/O bus 750, including a display device 743, an input device (e.g., an alphanumeric input device 742 and/or a cursor control device 741).

The communication device 740 allows for access to other computers (servers or clients) via a network. The communication device 740 may comprise a modem, a network interface card, a wireless network interface or other well known interface device, such as those used for coupling to Ethernet, token ring or other types of networks.

A method and system for unified communications threat management (UCTM) for converged voice and video over IP has been described with respect to specific examples and subsystems. It will be apparent to those of ordinary skill in the art that it is not limited to these specific examples or subsystems but extends to other embodiments as well.

We claim:

1. A computer-implemented method for real-time threat management, comprising:
 receiving a unified communication (UC) stream, wherein the unified communication (UC) stream comprises one or more streams related to one or more of IP-PBX, video, desktop conferencing, web conferencing, collaboration, presence, unified messaging, instant messaging (IM), voicemail, Interactive Voice Response (IVR), Automatic Call Distribution (ACD) or contact center applications;
 breaking the unified communication (UC) stream into sub streams;
 inspecting the sub streams using a plurality of packet processing engines in parallel;
 annotating the sub streams with meta-data and recommendation events from each of the plurality of packet processing engines;
 correlating and combining the one or more streams into an annotated unified communication (UC) stream containing the meta-data from each of the plurality of packet processing engines;
 processing the annotated unified communication (UC) stream using a plurality of engines, wherein the engines include protocol layer engines and UC application layer engines, and wherein the processing comprises making data contained in the annotated unified communication (UC) stream protocol agnostic, and wherein the data contained in the annotated unified communication (UC) stream comprises unified communication (UC) state properties including transport, individual stream sessions and correlated unified communication (UC) stream sessions properties, transactions, system, server, user, endpoint, security profiles, application properties and pointers to past records for matching stream IDs;
 generating a processed stream; and
 providing for one of blocking, quarantining, allowing, or redirecting the processed stream.

2. The computer-implemented method of claim 1, further comprising,
 transmitting the processed stream to a UC aware behavioral learning and decision engine;
 processing information in the meta-data, past behaviors, learned records for matching stream identifiers and recommendation events; and
 generating hints, recommendations, anomaly events, policy violations and alerts for the incoming stream.

3. The computer-implemented method of claim 1 further comprising:
 classifying the unified communication (UC) stream as a legitimate stream or an anomalic stream;
 creating a record entry in a database for the incoming stream based on the classification, wherein the record entry is one of blacklist, whitelist, don't know or put in watchlist.

4. The computer-implemented method of claim 3, wherein the unified communication (UC) stream is classified per-session, per-user, per-domain, per-application, per-user/application group.

5. The computer-implemented method of claim 3 further comprising:
   comparing a second incoming stream with record entries in the database; and
   dropping the second incoming stream without inspecting if the second incoming stream matches with a record entry of blacklist entities.

6. The computer-implemented method of claim 1, wherein the plurality of packet processing engines comprises signature engine, rate engine, protocol anomaly engine, stateful inspection engine, real-time context engine and proxy termination engine.

7. The computer-implemented method of claim 1, wherein the plurality of engines comprises Denial-Of-Service (DOS) engine, SPAM over Internet Telephony (SPIT) engine, policy engine, compliance/privacy engine, data validation engine and wiretapping engine.

8. The computer-implemented method of claim 1, further comprising:
   classifying the unified communication (UC) stream into a trusted stream or a malicious stream.

9. The computer-implemented method of claim 8, wherein the trusted stream is sent to backend servers for further processing.

10. The computer-implemented method of claim 8, wherein the malicious stream is further processed with remediation options.

11. The computer-implemented method of claim 10, wherein the remediation options comprise drop packets, blacklist, alert or force retry mechanism, capture port and honeypot.

12. A non-transitory computer-readable medium having stored thereon a plurality of instructions, said plurality of instructions when executed by a computer, cause said computer to perform:
   receiving a unified communication (UC) stream, wherein the unified communication (UC) stream comprises one or more streams related to one or more of IP-PBX, video, desktop conferencing, web conferencing, collaboration, presence, unified messaging, instant messaging (IM), voicemail, Interactive Voice Response (IVR), Automatic Call Distribution (ACD) or contact center applications;
   breaking the unified communication (UC) stream into sub streams;
   inspecting the sub streams using a plurality of packet processing engines in parallel;
   annotating the sub streams with meta-data and recommendation events from each of the plurality of packet processing engines;
   correlating and combining the one or more streams into an annotated unified communication (UC) stream containing the meta-data from each of the plurality of packet processing engines;
   processing the annotated unified communication (UC) stream using a plurality of engines, wherein the engines include protocol layer engines and UC application layer engines, and wherein the processing comprises making data contained in the annotated unified communication (UC) stream protocol agnostic, and wherein the data contained in the annotated unified communication (UC) stream comprises unified communication (UC) state properties including transport, individual stream sessions and correlated unified communication (UC) stream sessions properties, transactions, system, server, user, endpoint, security profiles, application properties and pointers to past records for matching stream IDs;
   generating a processed stream; and
   providing for one of blocking, quarantining, allowing, or redirecting the processed stream.

13. The non-transitory computer-readable medium of claim 12 having stored thereon a plurality of instructions, said plurality of instructions when executed by a computer, cause said computer to further perform:
   transmitting the processed stream to a UC aware behavioral learning and decision engine;
   processing information in the meta-data, past behaviors, learned records for matching stream IDs and recommendation events; and
   generating hints, recommendations, anomaly events, policy violations and alerts for the unified communication (UC) stream.

14. The non-transitory computer-readable medium of claim 12 having stored thereon a plurality of instructions, said plurality of instructions when executed by a computer, cause said computer to further perform:
   classifying the unified communication (UC) stream as a legitimate stream or an anomalic stream;
   creating a record entry in a database for the incoming stream based on the classification, wherein the record entry is one of blacklist, whitelist, or don't know.

15. The non-transitory computer-readable medium of claim 14, wherein the unified communication (UC) stream is classified per-session, per-user, per-domain, per-application, per-user/application group.

16. The non-transitory computer-readable medium of claim 14 having stored thereon a plurality of instructions, said plurality of instructions when executed by a computer, cause said computer to further perform:
   comparing a second incoming stream with record entries in the database; and
   dropping the second incoming stream without inspecting if the second incoming stream matches with a record entry of blacklist entities.

17. The non-transitory computer-readable medium of claim 12, wherein the plurality of packet processing engines comprises signature engine, rate engine, protocol anomaly engine, stateful inspection engine, real-time context engine and proxy termination engine.

18. The non-transitory computer-readable medium of claim 12, wherein the plurality of engines comprises Denial-Of-Service (DOS) engine, SPAM over Internet Telephony (SPIT) engine, policy engine, compliance/privacy engine, data validation engine and wiretapping engine.

19. The non-transitory computer-readable medium of claim 12 having stored thereon a plurality of instructions, said plurality of instructions when executed by a computer, cause said computer to further perform:
   classifying the unified communication (UC) stream into a trusted stream or a malicious stream.

20. The non-transitory computer-readable medium of claim 19, wherein the trusted stream is sent to backend servers for further processing.

21. The non-transitory computer-readable medium of claim 19, wherein the malicious stream is further processed with remediation options.

22. The non-transitory computer-readable medium of claim 21, wherein the remediation options comprise drop packets, blacklist, alert or force retry mechanism, capture port and honeypot.

* * * * *